United States Patent [19]
Isacson

[11] 3,965,473
[45] June 22, 1976

[54] DIRECTION FINDERS

[76] Inventor: Anders Edvin Isacson, Rotnasvagen 58, 141 42 Huddinge, Sweden

[22] Filed: Aug. 28, 1974

[21] Appl. No.: 501,342

[52] U.S. Cl. .............................. 343/122; 343/120; 343/119
[51] Int. Cl.² ........................................... G01S 5/04
[58] Field of Search ............ 343/119, 120, 122, 123

[56] References Cited
UNITED STATES PATENTS

| | | | |
|---|---|---|---|
| 2,448,006 | 8/1948 | Starr | 343/123 |
| 2,463,286 | 3/1949 | Kolster | 343/120 |
| 3,005,200 | 10/1961 | O'Meara | 343/123 |
| 3,534,368 | 10/1970 | Perper | 343/120 |

Primary Examiner—Maynard R. Wilbur
Assistant Examiner—T. M. Blum
Attorney, Agent, or Firm—George H. Mortimer

[57] ABSTRACT

A direction finder having an antenna system adapted to receive signals and provided with a right-hand and a left-hand lobe system. By coupling means said lobe systems can be made alternately operative. A comparison means is arranged for comparing received signals. Said coupling means is arranged to make operative only when main antenna and a first comparison means is adapted to compare the signal intensity in the right-hand lobe system with the signal intensity of said main antenna. A first indicator is arranged to be activated as soon as the signal intensity of the main antenna exceeds the signal intensity of one of the lobe systems. A second comparison means is arranged to compare signal intensities received on the right-hand and left-hand lobe systems. A second indicator is arranged to indicate the output signals of said second comparison means. Said right-hand and left-hand lobes comprising said lobe systems are arranged to partly overlap each other so that the maximum common signal intensity received exceeds the corresponding signal intensity received on the main antenna in the same direction.

2 Claims, 8 Drawing Figures

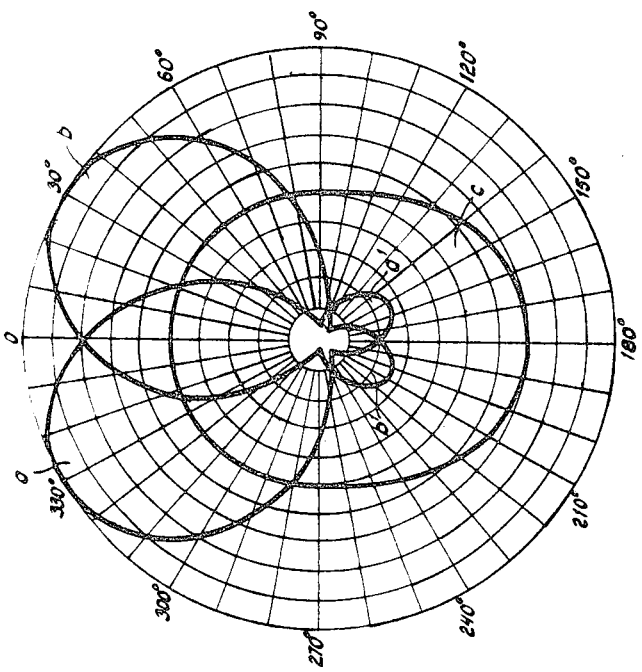
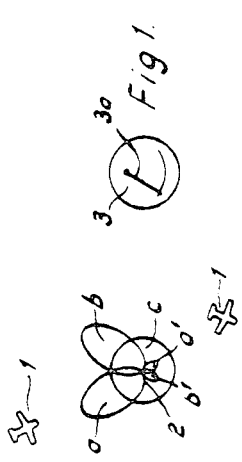
Fig 1.
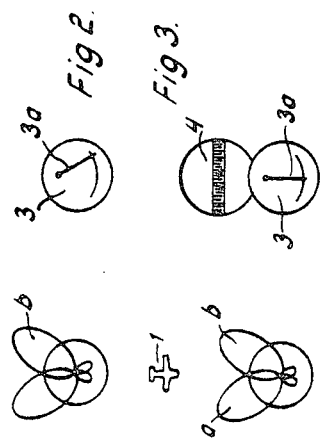
Fig 2.
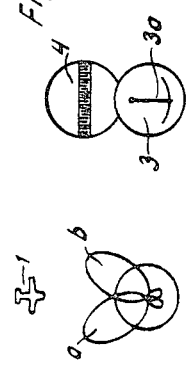
Fig 3.
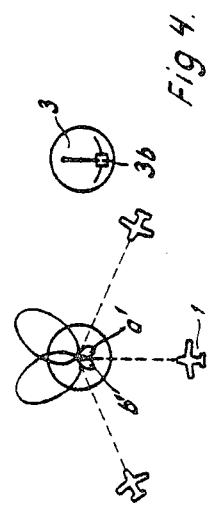
Fig 4.

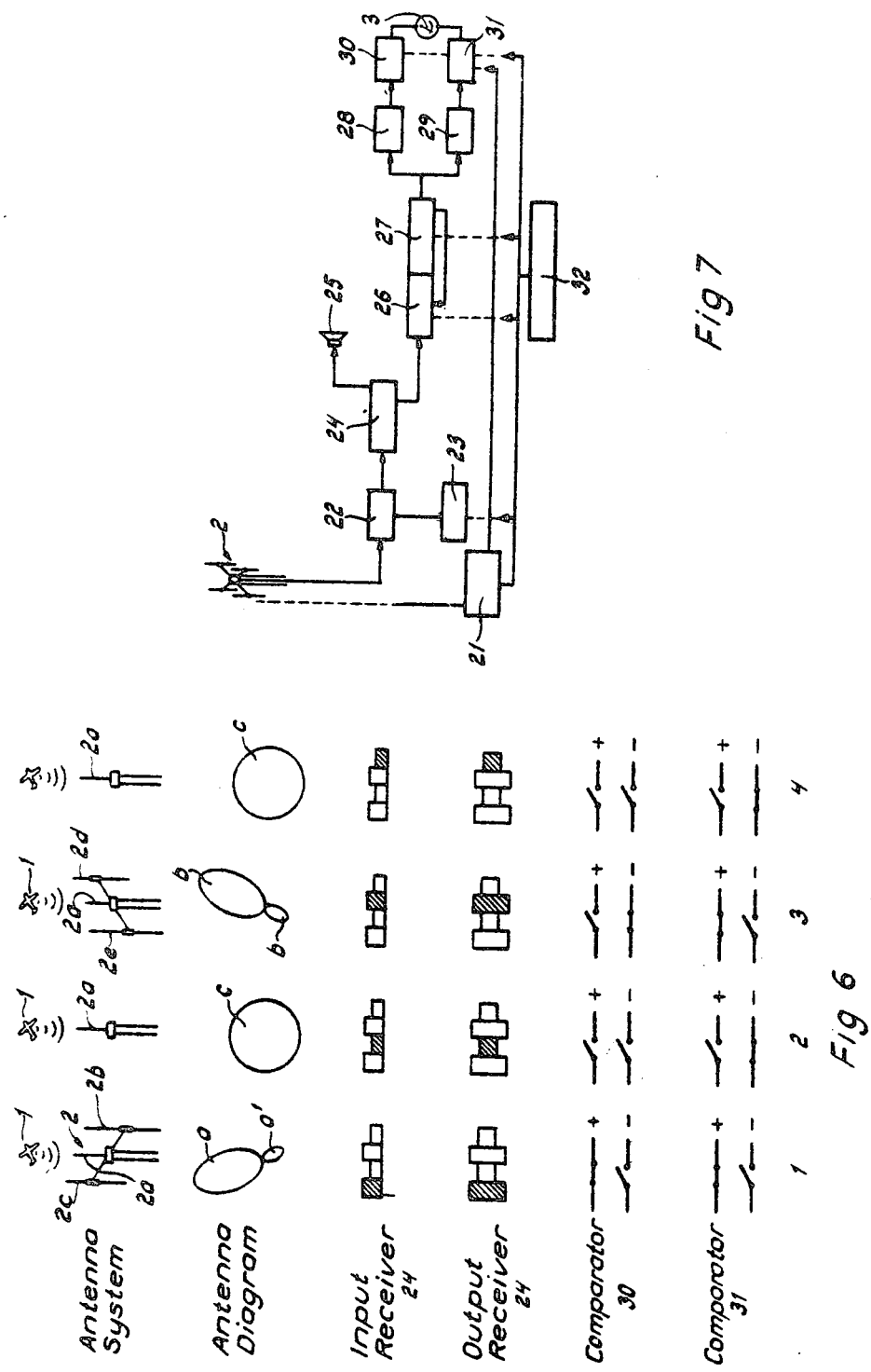

DIRECTION FINDERS

FIELD OF THE INVENTION

The invention relates to direction finders having antennae for receiving signals. The antenna system is constructed to provide for a right-hand and a left-hand lobe and is connected with a coupling device to enable said lobes to be made alternatingly operative. The direction finder is also provided with means for comparing the signals received and with means for indicating said signals.

BRIEF DESCRIPTION OF THE PRIOR ART

Direction finders having right-hand and left-hand lobes and which operate in accordance with the above are known to the art. With the known apparatus, the lobes are able to register signals which arrive directly rearwardly, thereby providing an error of 180°. This ability of a direction finder to show an error of 180° is, of course, totally unacceptable.

OBJECTS OF THE PRESENT INVENTION

An object of the present invention is to provide ways and means whereby the bearing of a signal transmitting apparatus can be determined without the aforementiond risk of a 180° error.

It is another object of the present invention to provide a simply constructed device, which is inexpensive in production.

Another object of the present invention is to provide a device, which is simple to handle or operate.

Still another object of the present invention is to provide a device, which is easy to carry, even if the device is attached to a foldable stand, which will be used to hold the antennae, and rotate the antennae together with a housing, in which the electrical circuits are arranged together with an electric source.

BRIEF DESCRIPTION OF THE MEANS WHICH WILL FULFILL THE OBJECTS

Accordingly, this invention consists in a direction finder having an antenna system adapted to receive signals and provided with a right-hand and a left-hand lobe system having coupling means with which said lobe systems can be made alternately operative, and a comparison means for comparing received signals, with which direction finder said coupling means is arranged to make operative only when main antenna and a first comparison means is adapted to compare the signal intensity in the right-hand lobe system and the left-hand lobe system with the signal intensity of said main antenna, and in which a first indicator is arranged to be activated as soon as the signal intensity of the main antenna exceeds the signal intensity of one of the lobe systems, wherein a second comparison means is arranged to compare signal intensities received on the right-hand and left-hand lobe systems, wherein a second indicator is arranged to indicate the output signals of said second comparison means, and wherein said right-hand and left-hand lobes comprising said lobe systems are arranged to partly overlap each other so that the maximum common signal intensity received exceeds the corresponding signal intensity received on the main antenna in the same direction.

BRIEF DESCRIPTION OF THE DRAWINGS

So that the invention will be more readily understood and further features thereof made apparent, a direction finder in accordance with the invention will now be described by way of example only with reference to the accompanying drawings, in which:

FIG. 1 illustrates a direction finder together with an associated indicator, the signal-transmitting apparatus being located in the left-hand lobe;

FIG. 2 illustrates a direction finder with associated indicator, the signal-transmitting apparatus being located in the right-hand lobe;

FIG. 3 illustrates a direction finder with associated indicator, the signal-transmitting apparatus being located between the right-hand and the left-hand lobes;

FIG. 4 illustrates a direction finder with associated indicator, the signal-transmitting apparatus being located in the rear lobes;

FIG. 5 illustrates an antenna radiation diagram for the right-hand lobe, the left-hand lobe and the lobe of a central antenna;

FIG. 6 illustrates pulses used in a direction finder constructed in accordance with the invention;

FIG. 7 is a block diagram of a preferred embodiment of the invention; and

DESCRIPTION OF A PREFERRED EMBODIMENT

Figure 8:
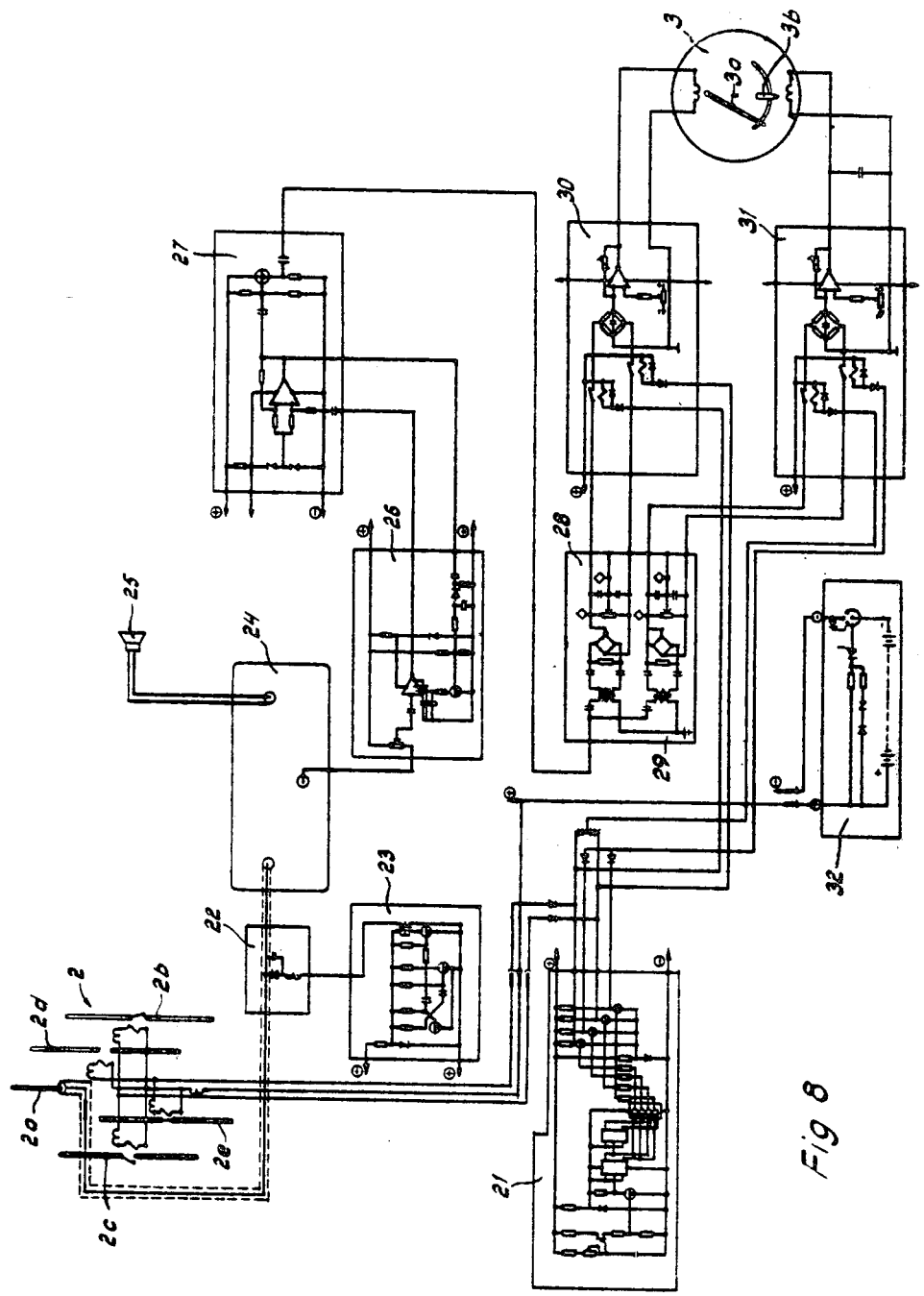
FIG. 8 is a wiring diagram for the components of the preferred embodiment shown in FIG. 7.

Thus, in the drawings there is illustrated a direction finding apparatus having a signal receiving antenna system. The direction finding apparatus of the present invention is intended to operate in conjunction with a signal-transmitting device 1, which with the illustrated embodiment has the form of an aeroplane. The direction finding apparatus has an antenna system 2 constructed in a manner hereinafter described. It can be mentioned here, however, that said system is constructed so that it obtains or receives signals from an area equivalent to an antenna radiation diagram as shown in $a, a'$, hereinafter referred to as the left-hand lobe system or antenna diagram, an antenna radiation diagram as shown by $b, b'$, hereinafter referred to as the right-hand lobe system or antenna diagram, and a circular antenna radiation sometimes diagram $c$, hereinafter sometimes referred to as the antenna radiation diagram of the central antenna or the main antenna. The direction finding apparatus also has an indicator 3, the indicating arm $3a$ of which occupies a position to the left of the indicator, as shown, when the radiation-transmitting device 1 is located in the left-hand lobe.

In FIG. 2, the indicating arm or needle $3a$ of the indicator 3 lies to the right of said indicator, showing that the signal-transmitting device 1 is located in the right-hand lobe $b$.

When the signal-transmitting device 1 is located centrally between the antenna radiation diagram $a$ and the antenna radiation diagram $b$, i.e. in the intersection between the antenna diagram of the right-hand and the left-hand lobes, the indicating arm or needle $3a$ will extend vertically, as shown in FIG. 3. When the indicator arm or needle takes the position shown in FIG. 3, the bearing of the device 1, i.e. said aeroplane, can be read off on a compass which may be suitably positioned over said indicator.

It is possible, however, to obtain the indicator readings shown in FIGS. 1–3 even when said aeroplane is located on the rearside of the antenna diagram, as illustrated in FIG. 4.

In accordance with the invention, when the signal-transmitting device 1 is located on the rearside of the antenna diagram, an indication 3b in the form of a warning flag is given, said warning being visible on the indicator 3. When such a warning is shown, the direction finder should be rotated through 180°.

FIG. 5 shows the antenna radiation diagram more precisely, the same reference numerals as those used in FIGS. 1–4 being used in connection with FIG. 5. From FIG. 5 it can be seen that the lobes a and b are so directed that they partially overlap one another, whereby the maximum common receiving signal intensity exceeds the corresponding received signal intensity of the main antenna c in the same direction.

FIG. 6 illustrates different coupling sequences with a direction finding apparatus in accordance with the present invention. The signal-transmitting device 1 transmits a signal towards the antenna system 2, which comprises a central antenna or main antenna 2a and two secondary radiators or parasite antennae 2b, 2c. By means of this combination there is obtained a left-hand lobe a, having a back lobe a' (FIG. 6) and beneath this there is the input voltage to a receiver 24 and an output voltage from said receiver. The settings of the different comparison means or comparitors 30, 31 and their voltages can be seen from the drawing, these being described in more detail hereinafter. Subsequent to the antennae combination 2a, 2b, 2c being made operative, the antennae 2b and 2c are made inoperative, whereby only antenna 2a is operative, there being obtained a signal receiving diagram such as that shown at c. The antennae 2d, 2e are then made operative, whereupon there is obtained a right-hand lobe b and a back lobe b'. Finally, the antennae 2d and 2e are made inoperative, to leave only antenna 2a, with its antenna radiation diagram c.

FIG. 7 shows a block diagram of a preferred embodiment, comprising an antenna system 2 which is controlled by a control pulse generator 21. The antenna system is connected with a modulator 22 which is actuated by means of a modulation generator 23. The modulator is connected to a receiver 24, which on its low-frequency output has a signal means, e.g., a loud speaker 25 and which is connected on its detector output with an electronic damping device 26 which is connected to an amplifier 27. The amplifier 27 delivers a control voltage to the electronic damping device 26. From the amplifier 27 the signal passes to two low-frequency rectifiers 28 and 29, the rectifier 28 being connected to a first comparison means 30 and the second rectifier 29 being connected to a second comparison means 31, the two comparison means being connected to an indicator 3. The direction finding apparatus can be operated by means of an array of batteries 32.

The structural design of the different components forming the direction finding apparatus will now be described in more detail with reference to FIG. 8. The antenna system 2 has a central antenna 2a provided with associated parasite elements 2b – 2e. Received signals from the antenna are fed to a modulator 22, which is connected with a modulator generator 23.

The different elements of the antenna system 2 are made operative via a control pulse generator 21, the outputs of which may also be connected to two comparison means 30 and 31, which will be hereinafter described. The modulator 22 is connected to a receiver 24, the low-frequency output of which is connected to a loud-speaker 25. The detector output of the receiver is connected to an electronic damper 26, which in turn is connected to an amplifier 27. From the amplifier 27 there is obtained a control voltage which is applied to the electronic damping device 26. The amplifier 27 is also connected to two equivalent low-frequency rectifiers 28 and 29, which can be constructed, to advantage, as a single unit. The signals are transmitted from the low-frequency rectifier 28 to a comparison means 30, which is arranged to compare the signal intensity between the right-hand lobe system and the left-hand lobe system. The compared voltage is fed to the indicator 3 and when the output voltage from the comparison means 30 is zero, the signal-transmitting device or indicator arm 3a will lie straight in front or straight down i.e., take a vertical position, indicating that the signal intensities from the right and left lobe systems are equal. When the output voltage from comparitor 30 shows the signal intensities from the right hand lobe system to be greater than that from the left hand lobe system, the indicator arm is moved to the right but when the signal intensity from the left lobe system is greater than that from the right, the indicator arm is moved to the left, as shown in FIG. 8. The angle of movement to right or left is a function of the relative difference in these intensities. The signals are transmitted from the rectifier 29 to a second comparison means 31, which is arranged to compare the signal intensity in the right-hand and left-hand lobe systems respectively with the signal intensity of the central antenna 2a. When the signal intensity of the central antenna 2a exceeds the intensities of the right-hand and left-hand lobe systems respectively, there is activated an indicating flag 3b which indicates that the signal-transmitting device is located behind or obliquely behind the direction finding apparatus, whereupon said device should be rotated.

FIG. 6 shows how the input voltage of the receiver 24 and the output voltage thereof occurs at the different periods of time when the antenna elements are made operative in different ways. When the left-hand lobe a is made operative, the voltage is fed in on the first comparison means 30 and the second comparison means 31. During the time when only the main antenna 2a is operative, only the signals to the comparitor 31 are sent. A comparison can now be effected between the left-hand lobe system and the circular lobe of the central antenna with regard to the intensity of the received signals. When the right-hand lobe system is made operative, it is connected to the comparison means 30 and to the comparison means 31, and when the lobe c of the central antenna is subsequently made operative, said voltage is charged solely to the comparison means 31, whereupon a comparison can now be made with regard to the intensity of the input signal.

In FIG. 8 is shown a comparison means 31, the output signal of which is connected to the indication 3b in the form of a warning flag. It is possible to delete sad indication 3b and let the output signal from comparison means 31 activate a device generating an oscillating current or voltage, which will be connected to the output terminals of the comparison means 30, said oscillating current or voltage will then act upon the indicating arm or needle to give it an ocillating pattern.

The invention is not restricted to the shown embodiments but may be used in all constructions having the features stated in the succeeding claim.

I claim:
1. A direction finder comprising in combination:
a. An antenna system including one central antenna (2a) capable of receiving signals from an area equivalent to a circular antenna diagram and four secondary radiators or parasite antennae, said central antenna (2a) in combination with two parasite antennae (2b) and (2c) being capable of receiving signals from an area equivalent to a right-hand lobe antenna diagram system, or said central antenna (2a) in combination with the other two parasite antennae (2d) and (2e) being capable of receiving signals from an area equivalent to a left-hand lobe antenna diagram or system, and means (24) for receiving signals received by the central antenna itself and signals received either by the left-hand or the right-hand lobe diagram or system in different time slots;
b. a control pulse generator (21) for generating output pulses and means connecting said pulse generator to said antenna system to activate the antennae in the following coupling sequences:
   i. one pair of parasite antennae and the central antenna,
   ii. central antenna alone,
   iii. the other pair of parasite antennae and the central antenna,
   iv. central antenna alone;
c. said signal receiving means (24) being connected to said antenna system for receiving a signal during each coupling sequence, a low frequency rectifier means (28) having an input connected to said signal receiving means (24) to receive such signals from said receiving means and an output, a first comparison means (30) for responding to the received signal during coupling sequence (i) and (iii);
e. a second indicator means (3b) connected to second comparison means (31) for responding when the signal received during coupling sequence (ii) or (iv) exceeds the signal received during coupling sequence (i) or (iii);
said control pulse generator (21) being adapted to generate output pulses to activate said first (30) and second (31) comparison means during each coupling sequence (i) to (iv) and said antenna system being so designed that said right-hand lobe antenna diagram partly overlaps said left-hand lobe antenna diagram so that the maximum common signal intensity received from each of said diagrams in one and the same direction exceeds the corresponding signal intensity received by the main antenna (2a) from the circular antenna diagram alone in said same direction.

2. A direction finder as set forth in claim 1 in which a modulator (22) is connected between said means (24) for receiving signals from the antenna system and said antenna system.

* * * * *